(12) United States Patent
Knorovich et al.

(10) Patent No.: US 12,015,678 B2
(45) Date of Patent: Jun. 18, 2024

(54) SYSTEM AND METHOD FOR TRANSFERRING CONTENT FROM A CONNECTED DEVICE

(71) Applicant: THE DATA COMPANY TECHNOLOGY LTD., Tel Aviv (IL)

(72) Inventors: Uri Knorovich, Tel Aviv (IL); Alon Bar Tzlil, Tel Aviv (IL); Yuval Shalev, Herzliya (IL)

(73) Assignee: THE DATA COMPANY TECHNOLOGIES INC., Wilmington, DE (US)

( * ) Notice: Subject to any disclaimer, the term of this patent is extended or adjusted under 35 U.S.C. 154(b) by 0 days.

(21) Appl. No.: 17/857,077

(22) Filed: Jul. 4, 2022

(65) Prior Publication Data

US 2024/0007540 A1 Jan. 4, 2024

(51) Int. Cl.
*H04L 67/50* (2022.01)
*H04L 67/1097* (2022.01)

(52) U.S. Cl.
CPC .......... *H04L 67/50* (2022.05); *H04L 67/1097* (2013.01)

(58) Field of Classification Search
CPC ............................. H04L 67/50; H04L 67/1097
See application file for complete search history.

(56) References Cited

U.S. PATENT DOCUMENTS 8,169,916 B1 * 5/2012 Pai ...................... H04N 21/2181
709/200
2016/0219420 A1 * 7/2016 Sah .................... H04W 28/0875

* cited by examiner

*Primary Examiner* — Emmanuel L Moise
*Assistant Examiner* — Zia Khurshid
(74) *Attorney, Agent, or Firm* — AlphaPatent Associates Ltd.; Daniel J. Swirsky

(57) ABSTRACT

A system for delivering content over a communication, including an interface for receiving a request for transferring content, where the request specifies optimization types for transferring the content, multiple control units, where each control unit maintains an open communication channel with delivery peers that communicate with destination servers, and a peer manager communicating with the multiple control units and with the interface, the peer manager configured for selecting a specific delivery peer according to the optimization types and connection parameters included in the request and a set of rules, and sending a command to a selected control unit which communicates with the specific delivery peer selected to transfer the content from a specific destination server of the multiple destination servers, where the selected delivery peer transfers the content from a specific destination server.

17 Claims, 3 Drawing Sheets

SYSTEM AND METHOD FOR TRANSFERRING CONTENT FROM A CONNECTED DEVICE

FIELD

The invention relates generally to content transfer in a data communication network.

BACKGROUND

The amount of data transferred over the Internet increases gradually. Companies and persons store their data online, such as e-commerce websites, social networks, video storage websites, governmental databases and others. In addition, there is a growing need to access this data for business reasons, such as monitoring SEO efforts, performing market research, analyzing stock market trends, testing websites, scraping social networks and the like.

Obtaining such data is complex and painful. There are some technical barriers—1. Significant engineering efforts are required to build web data pipelines. 2. Constant maintenance is necessary to ensure a continuous flow of web data. 3. Proxy networks are unpredictable.

Hence, there is a need to enable organizations to collect data from the Internet efficiently, cost-effectively and relatively fast.

SUMMARY

The invention, in an embodiment thereof, provides a system for delivering content over a communication network having multiple destination servers and multiple delivery peers, including an interface for receiving a request for transferring content from the communication network, where the request specifies one or more optimization types for transferring the content, multiple control units located in the communication network, each control unit of the multiple control units maintains an open communication channel with at least one delivery peer of the multiple delivery peers, the delivery peer is communicating with one or more of the multiple destination servers, a peer manager communicating with the one or more of the multiple control units and to the interface. The peer manager is configured for selecting a specific delivery peer from the multiple delivery peers according to the one or more optimization types and connection parameters included in the request and a set of rules, sending a command to a selected control unit of the multiple control units, the selected control unit is communicating with the specific delivery peer selected to transfer the content from a specific destination server of the multiple destination servers, where the selected delivery peer transfers the content from a specific destination server and sends the content to an address specified in the request.

In some cases, the request includes multiple destination servers and the control unit selects the specific delivery peer for each destination server of the multiple destination servers. In some cases, the peer manager includes a memory device, the memory device stores multiple triplets, each triplet includes a destination server and an optimal delivery peer for each optimization type. In some cases, the delivery peer is selected by the peer manager prior to receiving the request.

In some cases, the request specifies the specific destination server. In some cases, the one or more optimization types include a field of business and a geographic location of the content. In some cases, the field of business is selected from electronic commerce, social networks, finance, sports, entertainment, transportation, and sensor data.

In some cases, the peer manager computes a score to multiple optional peers based on the one or more optimization types. In some cases, the score is computed based on a communication requirement of the delivery peer, the communication requirement is stored in the peer manager concerning the optimization type.

In some cases, the communication requirement includes latency, stability, ability to change IP addresses fast, TCP properties, and Transport Layer Security TLS properties.

In some cases, the peer manager assigns the score to multiple optional peers during a transfer of the content from the specific destination server by the specific delivery peer.

In some cases, the peer manager includes memory storage, the memory storage stores scores of the multiple delivery peers in transferring according to various properties.

In some cases, the peer manager includes a load balancing module for selecting the specific delivery peer from multiple optional delivery peers, the multiple optional delivery peers having a score satisfying a requirement in the request based on prior transfer missions of the multiple optional delivery peers.

In some cases, the peer manager includes a prediction engine for predicting additional requests to be received at the interface based on prior requests, where the peer manager selects the specific delivery peer according to new requests predicted to be received at the interface after the selection of the specific delivery peer.

The invention, in another embodiment thereof, provides a method for delivering content over a communication network having multiple destination servers and multiple delivery peers, the method including receiving a request at an interface device, the request is received from client devices for transferring content from the communication network, where the request specifies properties for transferring the content, maintaining an open communication channel between multiple control units located in the communication network and multiple delivery peers, the delivery peer of the multiple delivery peers is communicating with one of the multiple destination servers, selecting a specific delivery peer from the multiple delivery peers according to the properties included in the request and a set of rules, sending a command to a selected control unit of the multiple control units communicating with the delivery peer to download the content from a specific destination server of the multiple destination servers. In some cases, the method further includes transferring the content by the specific delivery peer from a specific destination server.

In some cases, the method further includes transferring the downloaded content to an address specified by the client device.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

The invention, in embodiments thereof, provides a system and method for data transfer from and to a server located in a communication network. A technical challenge addressed by the invention is the customer's requirement to receive content quickly, while the customer's device is physically distanced from the server from which the content is transferred.

The invention, in embodiments thereof, provides a system for delivering content over a communication network having multiple destination servers and multiple delivery peers. The communication network may be the internet, and Local Access Network (LAN), or any other network that enables the exchange of data between machines and devices. The devices may be servers, cellular phones, personal computers, tablets, laptops, sensors, cameras, and the like. The system includes an interface for receiving a request for transferring content from the communication network. The term transferring is defined as both downloading content from the destination servers or uploading content or commands to the destination servers. The request specifies one or more optimization types for transferring the content. The optimization type dictates the manner of transferring the content, as elaborated below. The system also includes multiple control units located in the communication network, each control unit of the multiple control units maintains an open communication channel with at least one delivery peer of the multiple delivery peers. Each delivery peer of the multiple delivery peers is communicating with one or more of the multiple destination servers. The system also includes a peer manager communicating with one or more of the multiple control units and the interface. The peer manager is configured for selecting a specific delivery peer from the multiple delivery peers according to the one or more optimization types and connection parameters included in the request and a set of rules and sending a command to a selected control unit of the multiple control units, the selected control unit is communicating with the specific delivery peer which was selected to transfer the content from a specific destination server of the multiple destination servers. The selected delivery peer transfers the content from a specific destination server and sends the content to an address specified in the request.

Figure 1:
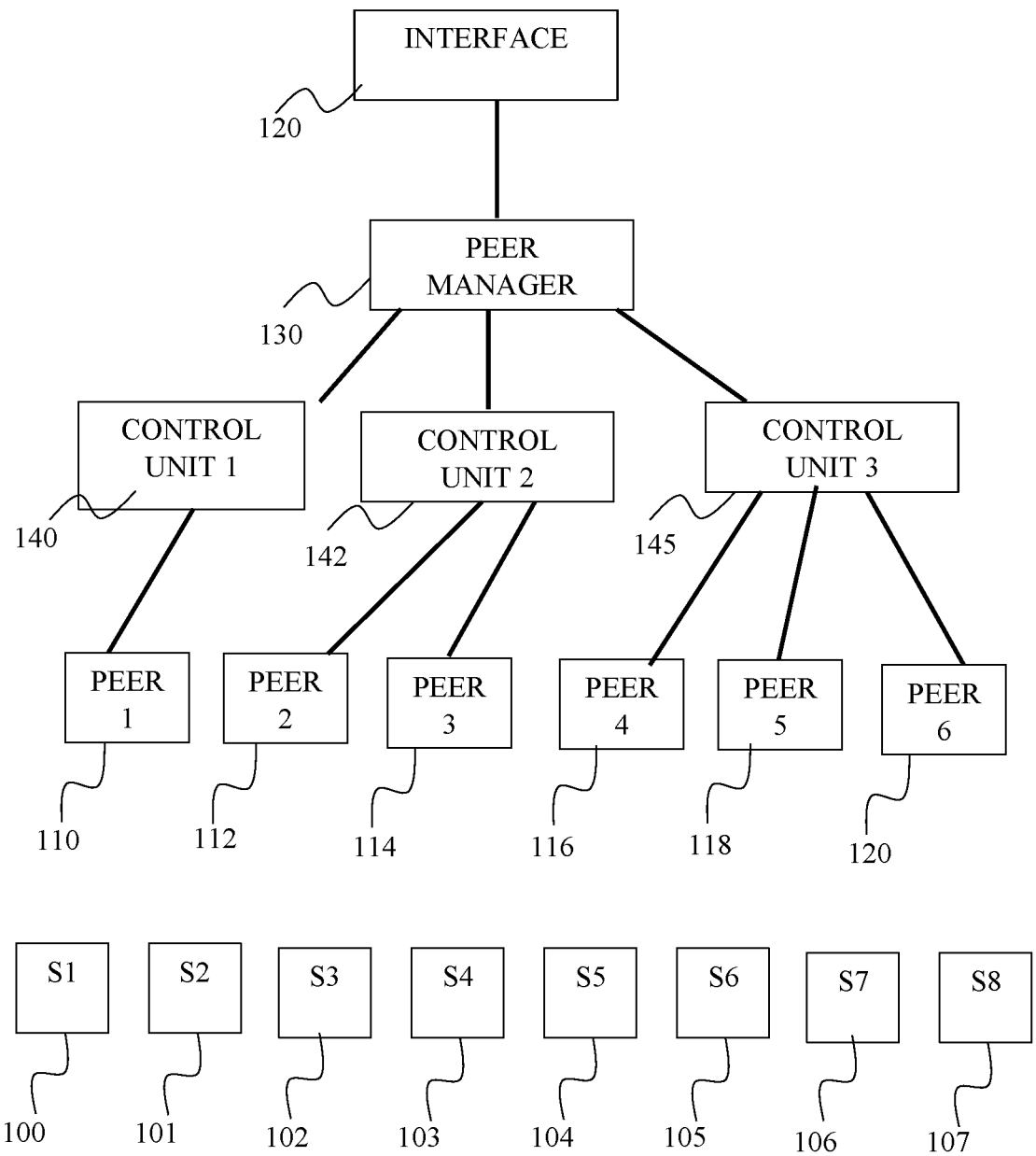
FIG. 1 shows a computerized environment for data transfer over a network, according to exemplary embodiments of the invention.

The system solves the technical problem by selecting the most appropriate delivery peer via which the content is sent from the destination server to the client's device or another address defined in the request. This way, the data is transferred in the fastest, most reliable, and most efficient manner, FIG. 1 shows a computerized environment for transferring content, according to exemplary embodiments of the invention.

The computerized environment includes destination servers 100, 101, 102, 103, 104, 105, 106, 107, 108. The destination servers may be any kind of device or machine, such as an electronic device or an address of a data storage service such as Amazon Web Service, Google Cloud Platform, and the like. The destination servers may be defined as any server or web page that can be accessed by a DNS and/or an IP address, or another address representing a device connected to a data network. The destination servers may store content, such as social media content, sports content, financial content, content from electronic commerce websites, statistical content, data collected by sensors, and the like. The content in the destination servers may be protected by a data security mechanism such as a password, encryption key, electronic signature, and the like, required to be satisfied to access the content. Data about the destination servers, such as geographic location, amount of data stored in the servers, download rate, IP address, and the like, may be stored in the system's memory or a memory accessible to the system, such as a data storage service.

The computerized environment includes interface 120 for receiving requests for content. The interface 120 may be implemented as a web page of a server communicating with the peer manager 130. The requests may be received from customers' devices, for example via a computer software installed on the customers' devices, or via an online platform accessed by the customers' personnel via the customers' devices. The requests may specify the optimization type requested when transferring the content. The optimization type may include a field of business and a geographic location of the content.

The computerized environment includes peer manager 130. The peer manager 130 obtains data concerning the delivery peers 110, 112, 114, 116, and 118, for example, the delivery peers' bandwidth and additional properties related to transferring content. The peer manager 130 is communicating with the interface 120 and receives the requests, or at least a portion of the requests, such as the optimization type and connection properties requested. The peer manager 130 selects the specific delivery peer to transfer the content based on a set of rules as elaborated below. The peer manager 130 is communicating with multiple control units 140, 142, 145, not to the delivery peers 110, 112, 114, 116, 118, as the number of delivery peers is likely to be much higher than the number of control units, to limit the number of open communication sessions held by the peer manager 130. The peer manager 130 sends a command to a control unit connected to the selected delivery peer and the control unit sends a command to the selected delivery peer to start transferring. The peer manager 130 stores a list of delivery peers, and an identifier of which control unit is connected to each delivery peer.

The computerized environment includes delivery peers 110, 112, 114, 116, 118. The delivery peers may be standard electronic devices connected to the communication network. The owners of the delivery peers may have an agreement with an operator of the transfer process, in which the device acting as the delivery peer is allocated with permission to the transfer process. The delivery peers may be servers, cellular phones, personal computers, tablets, laptops, sensors, cameras, and the like.

The computerized environment includes control units 140, 142, and 145. The control units 140, 142, 145 bridge between the peer manager 130 and the delivery peers 110, 112, 114, 116, 118. The control units 140, 142, and 145 maintain an open communication channel with at least one delivery peer of the multiple delivery peers. In some cases, the control units 140, 142, and 145 are communicating with many delivery peers, for example in the range of 10-5,000 peers for each control unit. This way, the peer manager 130 communicates with a limited number of devices.

Figure 2:
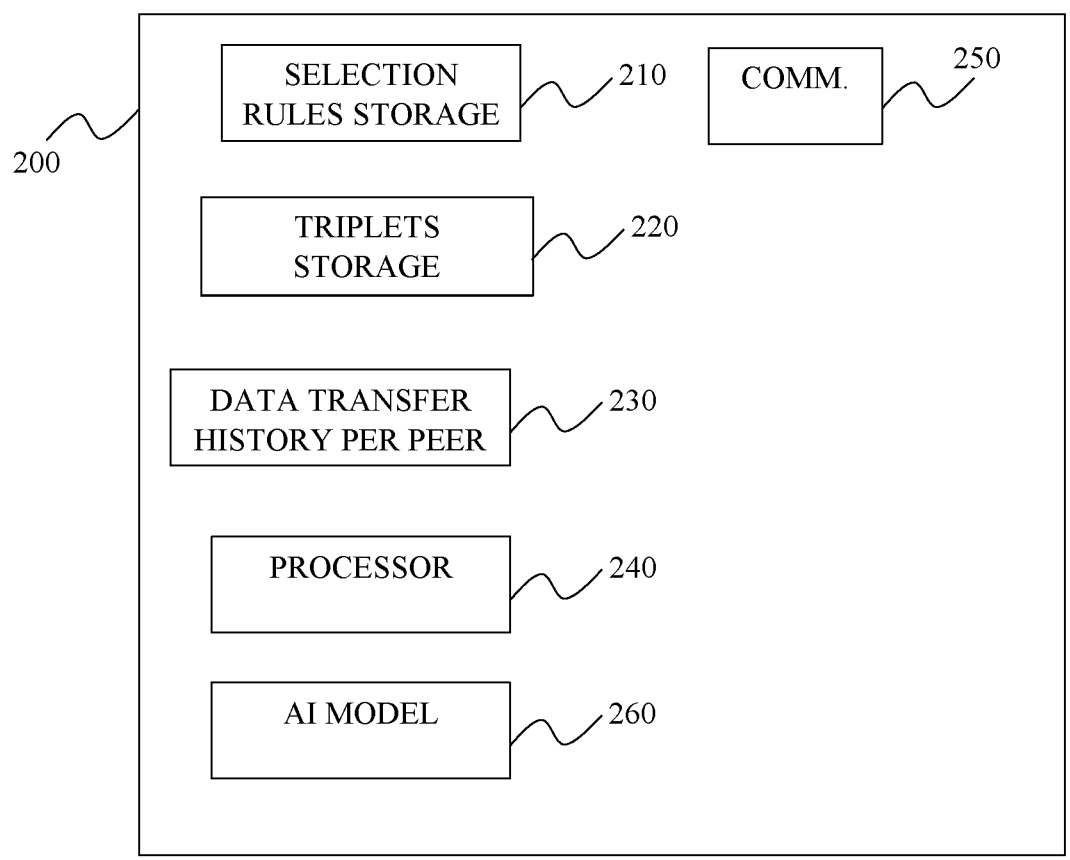
FIG. 2 shows a computerized peer manager for managing a data transfer process, according to exemplary embodiments of the invention.

FIG. 2 shows a computerized peer manager for managing a transferring process, according to exemplary embodiments of the invention.

The peer manager includes a selection rules storage 210. The selection rules stored in the selection rule storage 210 dictate which delivery peer is selected by the peer manager in various scenarios. For example, the selection rules may be a function that receives properties of the delivery peers close to a specific destination server and outputs which delivery peer is selected to transfer the content from the specific destination server. The selection rules may be used by the function to output a score for multiple optional delivery peers. The selection rules may also consider information inputted into the request, such as an optimization type, connection requirements, and the like. The selection rules may be updated frequently, for example, based on the performance of the delivery peers.

The peer manager includes a triplets storage 220 configured to store the best delivery peer, for a specific destination server, under a specific optimization type. This way, when a request arrives at the interface and specifies a specific destination server and a specific optimization type, the peer manager already has the best delivery peer and the data transfer process can begin directly without computations. The triplet may include the specific destination server, a specific optimization type, multiple optional delivery peers, and pre-computed scores for each of the optional delivery peers. This way, even if the most matching delivery peer cannot be assigned to the data transfer mission, the next best peer is already known to the peer manager.

The peer manager includes a data transfer history per-peer 230. The data transfer history enables the peer manager to predict additional requests to be received into the system. Based on the predicted additional requests, the peer manager may select delivery peers for other tasks. For example, in case there are 3 optional delivery peers to perform a data transfer task and one of the three can be used to perform another task, the peer manager may select one of the other two peers that cannot perform the other task in case there is a probability higher than a threshold that the other task is requested by the system's customers. The data transfer history 230 may also be used for load balance. For example, even in case one delivery peer received the highest score to perform a task, another delivery peer may be selected, to prevent the peer with the highest score from extra load/burden and delay.

The peer manager includes a processor 240 configured to execute a set of instructions to perform the processes disclosed herein. The processor 240 may be a hardware-based processor, a microprocessor, a general-purpose processor, and the like.

The peer manager includes an AI model 260 configured to select the best delivery peer for the current real-time request. The selection of the delivery peer may be performed by computing a score for multiple optional delivery peers and selecting the available delivery peer with the highest score. The target function executed by the AI model 260 considers the following parameters when computing the scores for the multiple optional delivery peers Diversity of delivery peers—optimize for selecting a delivery peer that was not selected before, or that the time elapsed since the delivery peer's last task is higher than a threshold representing time duration, such as 40 hours.

Different quality metrics of different delivery peers—how fast is each delivery peer when transferring data, how consistent and not prone to errors, how good is the delivery peer's IP reputation, etc.

Usage of delivery peers—choose a peer that is best in terms of not being used heavily on similar target server destinations to ensure its success.

Protection from abuse—have different customers be exposed to different delivery peers to minimize the "noisy neighbor" effect of another customer abusing the same delivery peer.

The peer manager includes a communication unit 250 configured to exchange information with other devices or machines. The information may be properties of the optional delivery peers, information inputted into the request, commands sent from the peer manager to a specific control unit, and the like. The communication unit 250 may use any communication protocol or technique, such as optical fibers, wireless communication, wired communication, the internet, cellular communication, and the like. sending data to other components either via the internet or via another network, such as a LAN, etc.

Figure 3:
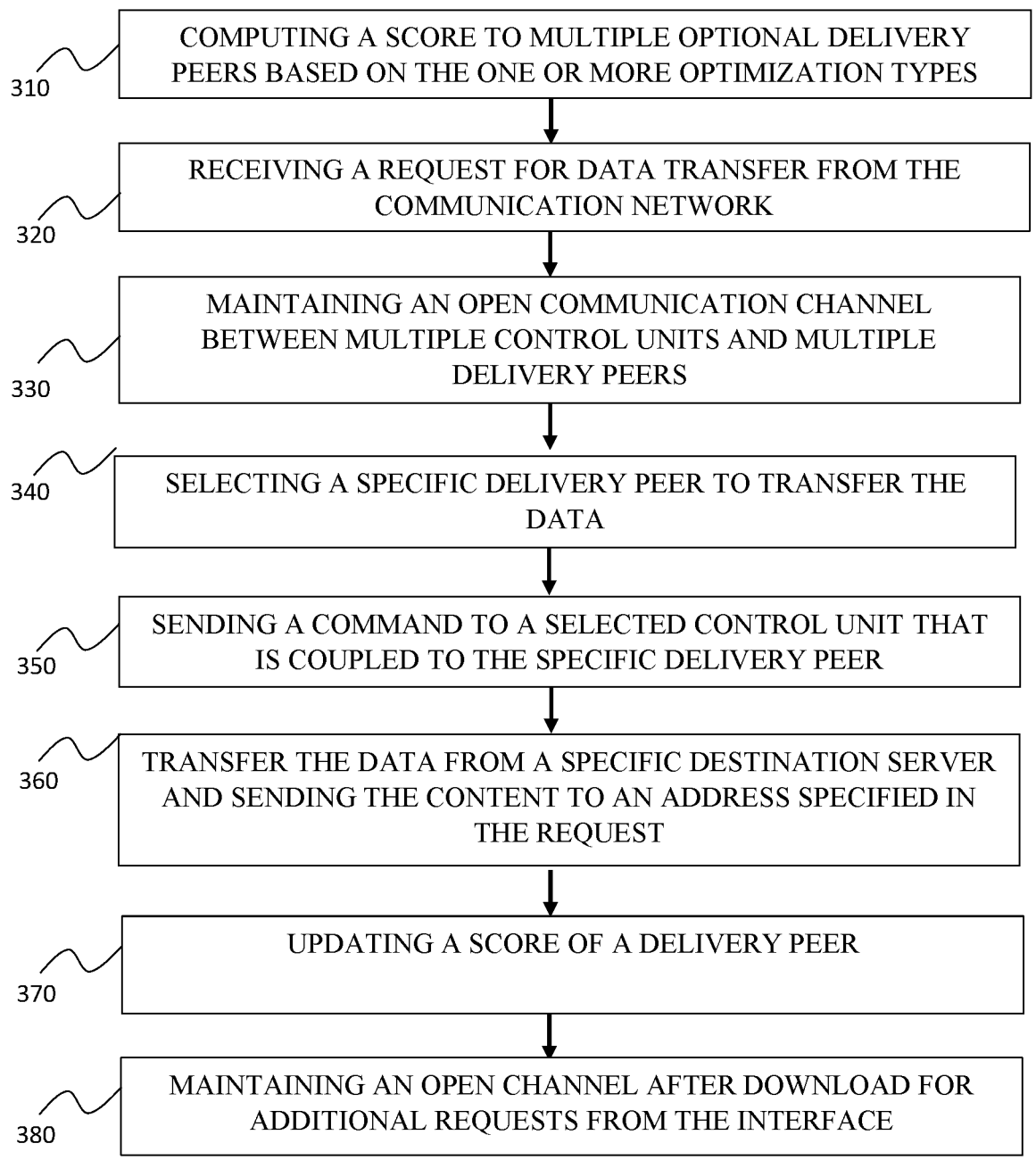
FIG. 3 shows a computerized method for managing a data transfer process, according to exemplary embodiments of the invention.

FIG. 3 shows a computerized method for managing a data transfer process, according to exemplary embodiments of the invention.

Step 310 discloses computing a score to multiple optional delivery peers based on one or more optimization types. The score may be adjusted periodically, for example, once a day, once a week, and the like. The score may be represented by a number. The score may be computed by a function that receives input data concerning the optional delivery peer, such as geographic location, bandwidth, processing capabilities, memory, and ranks the specific delivery peer received in prior data transfer assignments. The score may be computed according to information included in the request, such as optimization type, the identifier of the specific destination server, and the like. In some cases, the score may be computed according to information included in the request.

Step 320 discloses receiving a request for data transfer from the communication network. The request may be received via an online portal, such as a web page, or via a client terminal stored in a client device, the client terminal communicates with the interface communicating with the peer manager that selects the delivery peer to perform the missions included in the request.

Step 330 discloses maintaining an open communication channel between multiple control units located in the communication network and multiple delivery peers. The communication channels may be TCP/IP channels. The control units may communicate with multiple delivery peers in the communication network, to reduce the number of channels used by the peer manager. For example, in case there are 5 million peers that are available to perform data transfer missions, the system may have 100 control units, each control unit is connected on average to 50,000 peers. This way, the load on the peer manager is reduced, and the peer manager's resources are allocated to computing scores for the peers and selecting the best peer for each mission.

Step 340 discloses selecting a specific delivery peer from the multiple delivery peers according to the one or more optimization types and connection parameters included in the request and a set of rules. The specific delivery peer may be an optimal delivery that received the highest score. The specific delivery peer may be another peer, for example in case the peer with the highest score is temporarily unavailable or required for another mission, or for load balancing purposes Step 350 discloses sending a command to a selected control unit of the multiple control units, the selected control unit communicates with the specific delivery peer selected to transfer data and from a specific destination server of the multiple destination servers. The command may be sent as a message sent via a computerized application, such as a messaging application, or by sending a command to change a memory address in the selected control unit. The selected control unit then sends a command to the specific delivery peer to start data transferring.

Step 360 discloses the selected delivery peer transferring the content from a specific destination server and sending the content to an address specified in the request.

Step 370 discloses updating a score of a delivery peer. The score may be updated in response to an event, for example receiving an indication of the delivery peer's performance, such as latency, or technical difficulties related to the delivery peer or to a characteristic of the delivery peer, for example, when there are network problems in Russia, this may reduce the scores of the delivery peers located in Russia. The indications may be received via the interface or via another source. The indications may relate to properties such as download process, such as latency, speed, etc, and sends the indications to the peer manager, which updates a score of the relevant delivery peer accordingly.

Step 380 discloses maintaining an open channel after transfer for additional requests from the interface. The open channel is used to optimize the performance of data transfer via the selected delivery peer, to serve consecutive requests of the same sort at fast speeds.

It should be understood that the above description is merely exemplary and that there are various embodiments of the invention that may be devised, mutatis mutandis, and that the features described in the above-described embodiments, and those not described herein, may be used separately or in any suitable combination, and the invention can be devised in accordance with embodiments not necessarily described above.

While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings without departing from the essential scope thereof. Therefore, it is intended that the invention is not limited to the particular embodiments disclosed herein for carrying out this invention.

What is claimed is:

1. A system for delivering content over a communication network having multiple destination servers and multiple delivery peers, comprising:

an interface for receiving a request for transferring content from the communication network, wherein the request specifies one or more optimization types for transferring the content;

multiple control units located in the communication network, wherein each control unit of the multiple control units maintains an open communication channel with at least one delivery peer of the multiple delivery peers, and wherein said delivery peer communicates with one or more of the multiple destination servers; and a peer manager communicating with the one or more of the multiple control units and with the interface, wherein the peer manager obtains the data concerning the multiple delivery peers;

wherein said peer manager is configured for selecting a specific delivery peer from the multiple delivery peers according to a score corresponding to each delivery peer, wherein the score is computed based on the one or more optimization types and connection parameters included in the request, the data concerning the multiple delivery peers and a set of rules, and sending a command to a selected control unit of the multiple control units, said selected control unit is communicating with the specific delivery peer selected to transfer the content from a specific destination server of the multiple destination servers, wherein the selected delivery peer transfers the content from the specific destination server;

updating the score of a delivery peer of the multiple delivery peers, in response to receiving an indication of the delivery peer's performance, such as latency, related to the delivery peer or to a characteristic of the delivery peer; and maintaining an open channel after transfer for additional requests from the interface, which is used to optimize the performance of data transfer via the selected delivery peer, to serve consecutive requests of the same sort at fast speeds.

2. The system of claim 1, wherein the request comprises multiple destination servers and the control unit selects the specific delivery peer for each destination server of the multiple destination servers.

3. The system of claim 1, wherein the peer manager comprises a memory device, said memory device stores multiple triplets, each triplet comprises a destination server and an optimal delivery peer for each optimization type.

4. The system of claim 1, wherein the delivery peer is selected by the peer manager prior to receiving the request.

5. The system of claim 1, wherein the request specifies the specific destination server.

6. The system of claim 1, wherein the one or more optimization types comprise a field of business and a geographic location of the content.

7. The system of claim 6, wherein the field of business is selected from electronic commerce, social networks, finance, sports, entertainment, transportation, and sensor data.

8. The system of claim 1, wherein the peer manager computes a score to multiple optional peers based on the one or more optimization types.

9. The system of claim 8, wherein the score is computed based on a communication requirement of the delivery peer, said communication requirement is stored in the peer manager concerning the optimization type.

10. The system of claim 9, wherein the communication requirement comprises latency, stability, ability to change IP addresses fast, TCP properties, and TLS properties.

11. The system of claim 8, wherein the peer manager assigns the score to multiple optional peers during the transfer of the content from the specific destination server by the specific delivery peer.

12. The system of claim 1, wherein the peer manager comprises a memory storage, said memory storage stores scores of the multiple delivery peers in transferring according to various properties.

13. The system of claim 1, wherein the peer manager comprises a load balancing module for selecting the specific delivery peer from multiple optional delivery peers, said multiple optional delivery peers have a score satisfying a requirement in the request based on prior transfer missions of the multiple optional delivery peers.

14. The system of claim 1, wherein the peer manager comprises a prediction engine for predicting additional requests to be received at the interface based on prior requests, wherein the peer manager selects the specific delivery peer according to new requests predicted to be received at the interface after the selection of the specific delivery peer.

15. A method for delivering content over a communication network having multiple destination servers and multiple delivery peers, the method comprising:
- receiving a request at an interface device, said request is received from client devices for transferring content from the communication network;
- wherein the request specifies one or more optimization types for transferring the content;
- maintaining an open communication channel between multiple control units located in the communication network and multiple delivery peers, said delivery peer of the multiple delivery peers is communicating with one of the multiple destination servers;
- obtaining the data concerning the multiple delivery peers;
- selecting a specific delivery peer from the multiple delivery peers according to a score corresponding to each delivery peer, wherein the score is computed based on the one or more optimization types included in the request, the data concerning the multiple delivery peers and a set of rules;
- sending a command to a selected control unit of the multiple control units communicating with the delivery peer to download the content from a specific destination server of the multiple destination servers;
- updating a score of a delivery peer, in response to an event, for receiving an indication of the delivery peer's performance, such as latency, related to the delivery peer or to a characteristic of the delivery peer; and
- maintaining an open channel after transfer for additional requests from the interface, which is used to optimize the performance of data transfer via the selected delivery peer, to serve consecutive requests of the same sort at fast speeds.

16. The method of claim 15, further comprising transferring the content by the specific delivery peer from a specific destination server.

17. The method of claim 15, further comprises transferring sending the downloaded content to an address specified by the client devices.

* * * * *